United States Patent Office 3,641,147
Patented Feb. 8, 1972

3,641,147
2-POLYFLUOROLOWERALKYL BENZOPHENONES
John G. Topliss, West Caldwell, N.J., assignor to
Schering Corporation, Bloomfield, N.J.
No Drawing. Continuation-in-part of application Ser. No.
703,245, Feb. 6, 1968, which is a continuation-in-part
of application Ser. No. 650,581, July 3, 1967, now
Patent No. 3,429,874, which is a continuation-in-part
of application Ser. No. 603,737, Dec. 22, 1966, which
in turn is a continuation-in-part of application Ser. No.
520,658, Jan. 14, 1966. This application Mar. 28, 1969,
Ser. No. 811,637
Int. Cl. C07c 103/33
U.S. Cl. 260—562
5 Claims

ABSTRACT OF THE DISCLOSURE

This invention relates to novel chemical composition of matter useful as intermediates in the preparation of 2-oxo - 1,3 - dihydro-2H-1,4-benzodiazepines, and the 4-N-oxides thereof, having a polyfluoroloweralkyl radical attached at the 1-position thereof and to the methods for making and using such novel chemical intermediates.

This application is a continuation-in-part application of my co-pending application Ser. No. 703,245, filed Feb. 6, 1968, now abandoned which in turn is a continuation-in-part of application Ser. No. 650,581, filed July 3, 1967, (now U.S. Pat. No. 3,429,874) which in turn is a continuation-in-part of application Ser. No. 603,737, filed Dec. 22, 1966, (now abandoned) which in turn is a continuation-in-part of application Ser. No. 520,658, filed Jan. 14, 1966 (now abandoned).

FIELD OF INVENTION

This invention relates to compositions of matter identifiable in the art of chemistry as polyfluoroalkylated benzodiazepines, to the processes and intermediates useful in the preparation thereof, and to the therapeutic use of such benzodiazepines.

SUMMARY OF INVENTION

The invention sought to be patented in its composition of matter aspect may be described as X, Y-substituted-2-polyfluoroloweralkylamino benzophenone having the following structural formula:

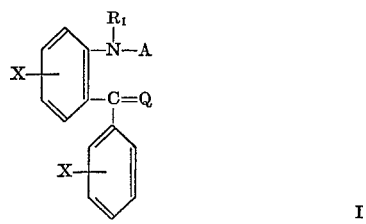

wherein $R_1$ is polyfluoroloweralkyl; Q is a member selected from the group consisting of

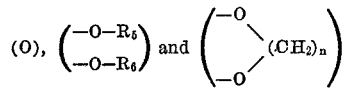

wherein $R_5$ and $R_6$ are lower alkyl and $n$ is an integer of from two to four; A is a member selected from the group consisting of hydrogen and

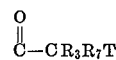

wherein T is a member selected from the group consisting of $NH_2$, halogen

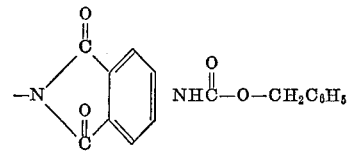

and $R_3$ and $R_7$ are members selected from the group consisting of hydrogen and lower alkyl; and X and Y are members selected from the group consisting of hydrogen, halogen, trifluoromethyl, nitro, lower alkyl and lower alkoxy.

The compounds of Formula I are useful in the preparation of polyfluoroalkylated benzodiazepines having significant pharmacological properties; said polyfluoroalkylated benzophenones being depicted by the following structural formulae:

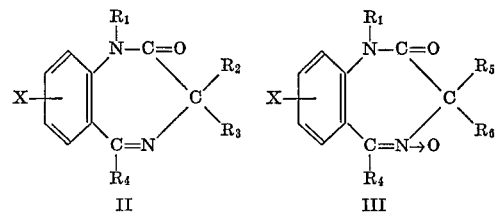

wherein X is a member of the group consisting of hydrogen, halogen, trifluoromethyl, nitro, lower alkyl, and lower alkoxy, $R_1$ is polyfluoroloweralkyl, $R_2$ is a member of the group consisting of hydrogen, lower alkyl, hydroxy, and lower alkanoyloxy, $R_3$ is a member of the group consisting of hydrogen and lower alkyl with the proviso that when $R_2$ is hydroxy or lower alkanoyloxy, $R_3$ is hydrogen, $R_4$ is a member of the group consisting of phenyl and Y-substituted phenyl wherein Y is as previously defined and $R_5$ and $R_6$ are members of the group consisting of hydrogen and lower alkyl.

The invention sought to be patented, in its composition of matter aspects, may be described as intermediates useful for the preparation of X-substituted 1-$R_1$, 2-oxo-3$R_2R_3$-5$R_4$ - 1,3 - dihydro-2H-1,4-benzodiazepines and as X-substituted 1$R_1$ - 2-oxo-3$R_5R_6$-5$R_4$-1,3-dihydro-2H-1,4-benzodiazepine-4-oxides, and to acid addition salts of certain members thereof, wherein $R_1$ is polyfluoroloweralkyl, $R_2$ is hydrogen, lower alkyl, hydroxy of lower alkanoyloxy, $R_3$ is hydrogen or lower alkyl with the proviso that when $R_2$ is hydroxy or lower alkanoyloxy, $R_3$ is hydrogen; $R_4$ is phenyl or Y-substituted phenyl wherein Y is as previously defined; $R_5$ and $R_6$ are hydrogen or lower alkyl; and X is as previously defined.

In one of its process aspects the instant invention may be described as polyfluoroalkylating either a 2-oxo-3$R_2R_3$-5$R_4$-1,3-dihydro-2H-1,4-benzodiazepine or a 2-oxo-3$R_5R_6$-5$R_4$-1,3-dihydro-2H-1,4-benzodiazepine-4-oxide.

In another of its process aspects this invention may be described as N-polyfluoroalkylating a 2-aminobenzophenone and converting said polyfluoroalkylated product obtained therefrom to the desired 2-oxo-3$R_2R_3$-5$R_4$-1,3-dihydro - 2H - 1,4-benzodiazepine-2-one and the 4-oxides thereof.

In another of its process aspects, this invention may be described as residing in the concept of administering a polyfluoroalkylated benzodiazepine tangible embodiment of this invention so as to elicit an effect upon a mammalian central nervous system and by so doing render such tangible embodiments useful as muscle relaxants, sedatives, anti-convulsants and anti-anxiety agents.

In yet another of its process aspects, this invention may be described as residing in the concept of administering a tangible embodiment of this invention (I) to a mammal to elicit an anti-androgenic, analgesic, antiviral effect and an effect upon the central nervous system.

As used herein, the term "lower alkyl" refers to both straight and branched-chain hydrocarbon radicals having up to six carbon atoms such as methyl, ethyl, propyl, isopropyl, n-butyl, t-butyl, and the like. The term "halogen" comprehends all four halogens, preferably chloro and bromo. The term "polyfluoroloweralkyl" refers to lower alkyl radicals substituted with more than one fluoro radical and preferably includes such moieties as trifluoromethyl 2,2,2-trifluoroethyl, and 2,2,3,3,3-pentafluoropropyl and the like. "Lower alkoxy" includes ether radicals wherein the lower alkyl moiety is as defined for "lower alkyl" above such as for example, methoxy, ethoxy, propoxy and the like. "Lower alkanoyloxy" includes those esters containing the acyl radicals of alkanoic acids including such radicals as formyl, acetyl, propionyl, butyryl, valeryl, hexanoyl and the branched-chain isomers thereof.

In general, the N-polyfluoroloweralkyl-2-oxo-5$R_4$-1,3-2H-1,4-benzodiazepines of Formulae II and III may be prepared by polyfluoroalkylating the appropriate 2-oxo-5$R_4$-1,3-dihydro - 2H - 1,4 - benzodiazepine. Alternatively, they may be prepared by synthesiziing the appropriately substituted benzodiazepine from intermediates already bearing the polyfluoroloweralkyl radicals.

When it is desired to prepare the N-polyfluoroalkylated-2-oxo-5$R_4$-1,3-dihydro - 2H - 1,4 - benzodiazepines from 2-oxo-5$R_4$-1,3-dihydro - 2H - 1,4 - benzodiazepines several polyfluoroalkylation procedures may be utilized. In a preferred instance the benzodiazepine is subjected to alkylation with a sulfonate ester of polyfluoroloweralkanol of the general formula $R_1OSO_2Z$, wherein $R_1$ is polyfluoroloweralkyl (preferably trifluoroethyl) and Z is a member of the group consisting of alkyl, aryl, aralkyl and polyhalolower alkyl. Exemplary of such sulfonate esters are 2,2,2-trifluoroethyl methyl sulfonate, 2,2,2-trifluoroethyl benzyl sulfonate, 2,2,2-trifluoroethyl trichloromethyl sulfonate and 2,2,3,3,3-pentafluoropropyl methyl sulfonate and the like. In effecting this alkylation reaction, the reactants are generally heated together in an anhydrous solvent system at temperatures up to 100° in the presence of bases such as sodium hydride, sodium amide, sodium methoxide, potassium t-butoxide and the like. Suitable anhydrous solvents useful for this reaction are dimethylformamide, dimethylacetamide, diphenyl ether, diglime, tetaralin and the like. Alternatively, the appropriately substituted benzodiazepine starting materials may be alkylated with a polyfluoroalkyl halide such as 2,2,2-trifluoroethyl halide and 2,2,3,3,3-pentafluoropropyl halide, said halides having an atomic weight greater than 19, preferably iodine. The latter polyfluoroalkylation reaction is effected in non-reactive organic solvents such as dimethylformamide or aromatic hydrocarbons like benzene, toluene or xylene in the presence of a basic condensing agent according to standard techniques. Exemplary of basic condensing agents are sodium methoxide, sodium hydride, potassium t-butoxide, sodium amide, and the like. The reaction is usually conducted at temperatures in the range of from about 20 to about 110° C. preferably around 65° C. and for a period of time ranging from 1 to 24 hours, preferably about 7 hours, followed by the further addition of polyfluoroalkyl halide and further reaction for approximately 16 hours. The polyfluoroalkylated benzodiazepine products are isolated by filtration of the insoluble salts, evaporation of the filtrate, further isolated by selective solvent extraction techniques, and purified by chromatographic techniques such as by elution from an alumina adsorption column.

The foregoing reaction may be schematically depicted as follows:

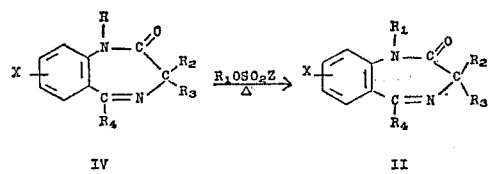

wherein X, $R_1$, $R_2$, $R_3$, $R_4$ and Z are as previously defined.

The benzodiazepine starting compounds IV and their precursors are prepared by methods analogous to those described in the literature such as J. Org. Chem. 27 562ff and 3181ff.

The 2-aminobenzophenone precursors are preparable by well described methods, the choice of methods being dependent on the position and kind of substituents desired on the aromatic rings. A most general method utilizing a substituted anthranilic acid (V) is that described in J. Org. Chem. 27, 3181, wherein an anthranilic acid (V) by reaction with acetic anhydride forms a benzoxazinone (VI) which, upon reaction with the appropriate Grignard reagent, followed by hydrolysis yields the desired 2-aminobenzophenone. This sequence of reactions may be depicted as follows:

Reaction Scheme A:

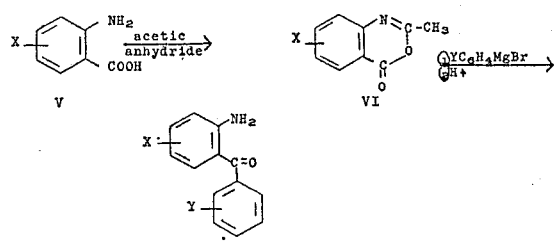

X and Y being as previously defined.

Exemplary of another suitable method for preparing 2-aminobenzophenones, is that which involves the condensation of an X-substituted aniline (VIII) with benzoyl chloride (IX) under Friedel-Crafts reaction conditions and rigorously hydrolyzing the primary reaction product yielding the desired 2-aminobenzophenone (VII).

Reaction Scheme B:

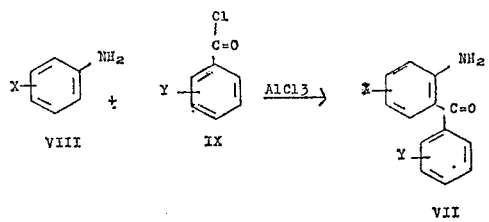

X and Y being as previously defined.

A preferred method utilizes the oxidative fission of the appropriate X and Y-substituted 2,3-diphenylindole, such as with chromium trioxide according to standard techniques, followed by hydrolysis of the so-formed 2-benzamido-X-substituted benzophenone. This sequence of reactions may be schematically depicted as follows:

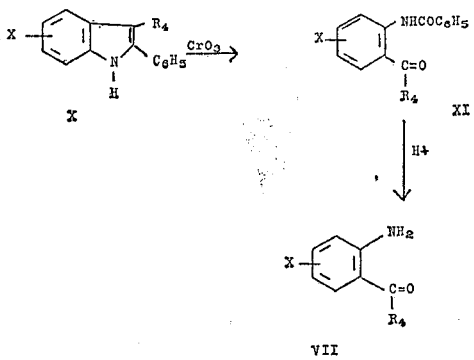

X and R$_4$ being as previously defined.

It is evident that the position para to the amino group (of Formula VII) corresponds to the 7-position in the final product; a substituent meta to the amino group will appear in the 6- or 8-position of the final product while an ortho substituent will appear in the 9-position of the final product. In those instances wherein a mixture of 6- and 8-position isomers are formed such compounds may easily be separated by the usual and standard techniques, e.g. chromatography.

The cyclization of the 2-aminobenzophenones (VII) to give rise to the X-substiuted 2-oxo-5R$_4$-1,3-dihydro-2H-1,4-benzodiazepines (IV) is effected by any number of methods well known in the art. For example, condensation of a 2-amino-bezophenone VII with a glycine ethyl ester hydrochloride, preferably in the presence of pyridine solvent and with heat gives rise to the cyclize starting material IV. Reaction sequence is depicted as follows:

Reaction Scheme C:

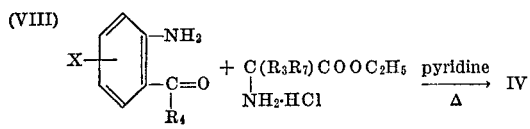

X and R$_4$ are as previously defined, R$_3$ and R$_7$ being hydrogen.

Alternatively, a glycylamidobenzophenone may be prepared and subsequently cyclized by heating in a nonreactive solvent such as pyridine. The glycylamidobenzophenones are obtained by acylating the appropriate 2-aminobenzophenone with a glycyl hydrochloride or a haloacetyl halide. In the instance wherein the 2-aminobenzophenones, as well as those other intermediates embraced by Formula VII are acylated with a haloacetylhalide (e.g. bromoacetyl bromide) the intermediate obtained therefrom (XII) is treated with ammonia, which, as in the case of the product obtained by reacting a glycylchloride hydrochloride with the aminobenzophenone, will cyclize in situ under the reaction conditions producing the corresponding 1,4-benzodiazepine. If desired, the acylating reagents may bear protecting groups which upon hydrolysis, will be split off to form the desired glycylamidobenzophenone. These alternative methods for producing the benzodiazepine (IV) may be depicted as follows, bearing in mind that although the specific carbobenzoxy and phthalimido protective groups are shown, it is to be understood that other equivalently functioning protective groups may similarly be used.

Reaction Scheme D:

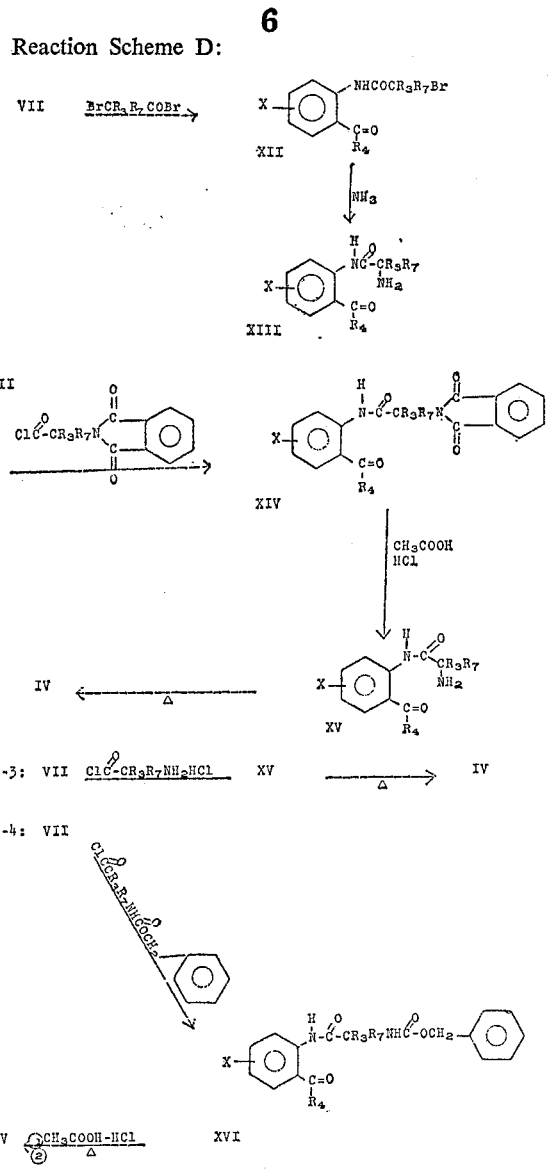

In each of D-1 through D-4, X and R$_4$ are as previously defined, R$_3$ and R$_7$ are hydrogen.

When it is desired to prepare the polyfluoroalkylated-2-oxo-5R$_4$-1,3-dihydro-2H-1,4-benzodiazepines of Formula II from intermediates already bearing the polyfluoroloweralkyl radicals, several routes of synthesis are applicable depending upon the ready availability of the starting materials. In general, however, the several routes of synthesis ultimately employ an appropriately Z-substituted 2-(N-polyfluoroloweralkylamine)-benzophenone which, by acylation and cyclization steps described for Reaction Schemes C and D, form the desired compounds of Formula II. For example, a 2-(2,2,2-trifluoroethylamino)-benzophenone may be acylated with bromoacetyl bromide to yield the corresponding 2-[N-(2,2,2-trifluoroethyl)-α-bromoacetamide]-benzophenone, which upon treatment with ammonia yields the corresponding 2-[N-(2,2,2-trifluoroethyl)-α-aminoacetamide]-benzophenone, which compound simultaneously undergoes cyclization under the conditions of amination.

The preparation of the key 2-(N-polyfluoroloweralkylamino)-benzophenone intermediates (I) (A=hydrogen) may readily be accomplished by any one of several techniques. Exemplary of such techniques is the above-described alkylation with a polyfluoroloweralkyl halide, and alkylation with a sulfonate ester of polyfluoroalkanols of the formula R$_1$OSO$_2$Z (as previously defined). In effecting this alkylation the reactants are heated together in an anhydrous solvent system at reflux temperatures in the presence of inorganic bases such as potassium carbonate. Suitable anhydrous solvents are diphenyl ether, diglime, tetralin, and the like. In addition to the foregoing, the appropriate aminobenzophenones may be first tosylated, whereupon the tosyl derivative will be subjected to polyfluoroalkylation techniques and the resulting product hydrolyzed to form the desired intermediates of Formula I (A=hydrogen).

Of course, other variations may be applied to prepare the desired polyfluoroalkylated intermediates but such variations are to be recognized as equivalents of the above-described processes. For convenience, in describing the variations, the term "trifluoroethylation" is often used. It is to be understood, however, that the steps described are of general applicability and that the use of the term trifluoroethyl is exemplary but in no way limiting. For example, instead of trifluoroethylating a 2-aminobenzophenone it is feasible to apply the various trifluoroethylation techniques to compounds which, once they are trifluoroethylated are convertible to the desired 2-(2,2,2-trifluoroethylamine)-benzophenones. The conversion to the desired intermediates useful in the preparation of the compounds of Formula II may be structurally depicted as follows:

Reaction Scheme E:

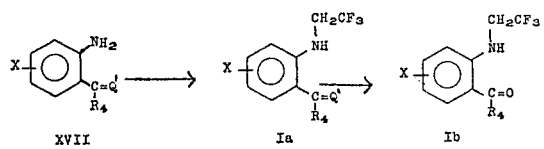

wherein Q' is a moiety convertible to the desired carbonyl function such as a ketal or a cyclic ketal, X and $R_4$ are as previously defined. The conversion to the carbonyl function may be accomplished by techniques well known in the art.

It is, of course, also possible to form the desired 2-(2,2,2-trifluoroethylamino)-benzophenone by conducting a Friedel-Crafts type reaction upon the appropriate X-substituted N-(2,2,2-trifluoroethyl)-aniline, said trifluoroethylated aniline being prepared from the appropriate X-substituted aniline by any one of the above described trifluoroethylation techniques. Alternatively, the N-polyfluoroloweralkylaniline intermediates may be reacted with bromoacetyl bromide to yield the appropriate X-substituted-N(α-bromo acetyl)-N-polyfluoroalkyl) - aniline, which when reacted with an X-substituted benzoyl halide under Friedel-Crafts reaction conditions produces the previously described 2[N-(polyfluoroloweralkyl) - α - bromoacetamido]-benzophenones. Such reactions may be depicted as follows:

Reaction Scheme F:

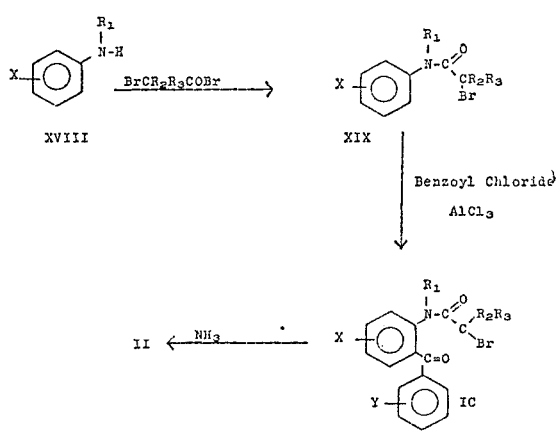

wherein X and Y are as previously defined, $R_2$ and $R_3$ are hydrogen and $R_1$ is trifluoroethyl.

By subjecting the polyfluoroalkylated product (II) to the action of a peroxy acid like peracetic acid, compounds of Formula IIIa are prepared. Alternatively, the intermediate, IV, can be N-oxidized and then polyfluoroalkylated as described above.

To prepare tangible embodiments of Formula III wherein $R_2$ or $R_3$ is hydroxy or lower alkanoyloxy the N-oxide of Formula IIIa is heated with acetic anhydride. In this reaction, $R_2$ and $R_3$ must be hydrogen. The acetate (XX) so obtained is hydrolyzed to the hydroxy compound (XXI) via titration with alkali. This transformation is depicted as follows:

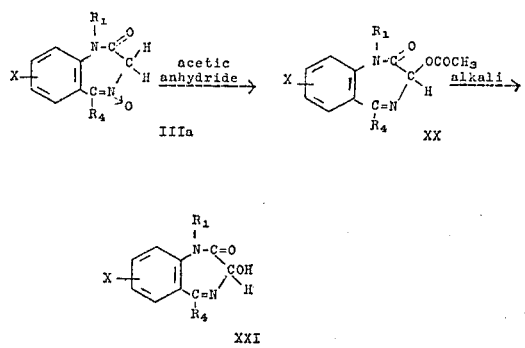

wherein X, $R_1$ and $R_4$ are as previously defined.

The hydroxyl group thus introduced is amenable to acylation in the usual manner to produce other lower alkanoyloxy derivatives such as with acid chlorides or anhydrides of propionic acid, butyric acid, valeric acid and the like.

The preferred method of synthesis when the polyfluoroalkyl group is trifluoromethyl is as follows:

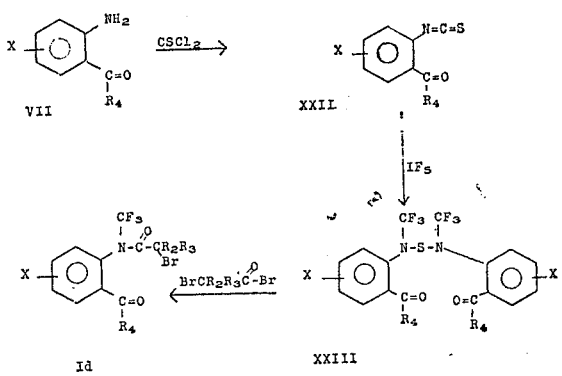

wherein X, $R_2$, $R_3$ and $R_4$ are as previously defined.

The 2-aminobenzophenones (VII) are treated with thiophosgene to give the corresponding isothiocyanates (XXII) which is then allowed to react with iodine pentafluoroide to give the corresponding bis (N-trifluoromethylamino)sulfide (XXIII). Reaction of XXIII with bromoacetyl bromide or a functional equivalent gives the required intermediates (Id).

The 2 - polyfluoroloweralkylamino - benzophenones of Formula I exhibit anti-androgenic effects upon being subjected to standard pharmacological test procedures and as such are useful in anti-androgenic therapy such as the treatment of benign prostatic hypertrophy. Exemplary of of the foregoing, when subjected to an anti-androgenic test procedure of Neri et al. in the European Journal of Pharmacology 1 (1967) pages 438–444; the above-described tangible embodiments exhibited significant activity in mammals at about 100–200 mg./kg. of body weight per day.

The α-haloacetamide (e.g. 2-polyfluoroloweralkyl bromoacetamide) and the α-aminoacetamide (e.g. 2-glycyl) derivatives of the foregoing tangible embodiments exhibit CNS activity and are especially useful as muscle relaxants when administered at about 50–100 mg./kg. per day to mammalian hosts; the foregoing being demonstrated by the test procedures described by Irwin, S. and Tedeschi et al. in the publications set forth below. Further, the α-haloacetamide derivatives exhibit anti-writhing activity at about 50–100 mg./kg./day; said activity being indicative of analgesic properties. Anti-writhing activity is essentially the ability of a compound to abate the "writhing" caused by the injection (i.p.) of an irritant (e.g. aqueous acetic acid) into a test animal. The test is described in detail in the Hendershot, L. C., et al. publication set forth below.

The 2-polyfluoroloweralkylamino-benzophenones of this invention may be administered in the above-described dosage ranges in the manner described below for the 1-polyfluoroloweralkyl - 2 - oxo-1,3-dihydro-2H-1,4-benzodiazepine tangible embodiments.

The 1 - polyfluoroloweralkyl - 2 - oxo - 1,3 - dihydro-2H-1,4-benzodiazepine tangible embodiments of this invention exert an effect on the central nervous system as determined by standard pharmacological evaluation and as such are useful as tranquilizer or anti-anxiety agents. In addition the novel compounds exhibit valuable anti-convulsant and muscle relaxant properties. In pharmacological testing there has been observed significant differentials between a tranquilizing dose and one which causes neurological impairment. The therapeutic ratio (ratio of effective dose required to produce a tranquilizing effect) is significantly higher in the tangible embodiments than that observed in analogous compounds presently known in the art. In particular, 7-chloro 1,3-dihydro - 5 - phenyl - 1(2,2,2 - trifluoroethyl) - 2H - 1,4-benzodiazepine-2-one has a therapeutic ratio of about 13 which indicates that the neurological impairment dose is about 13 times greater than that dose required to produce a tranquilizing effect according to accepted pharmacological testing methods. By way of further advantage, it has been found that test animals do not develop a tolerance to the tangible embodiments on repeated treatment in anti-convulsant evaluation.

The benzodiazepine and the benzophenone tangible embodiments of this invention are preferably administered via the oral route and for such are compounded into pharmaceutical dosage forms such as tablets, capsules, elixirs, solutions and the like. In the compounding, a dosage unit may contain the usual excipients like starches, gums and alcohol bases commonly employed. In addition, the tangible embodiments may be incorporated into a dosage unit together with another active therapeutic agent.

Based upon standard laboratory investigative procedures such as the Antagonism of Pentylene Tetrazole, Everett and Richards, J. Pharm. and Exp. Ther., vol. 81, pg. 402 (1944) and Antagonism of Maximal Electro Shock-Induced Seizures in Mice. Synward, E. A. et al. J. Pharm. and Exp. Ther., vol. 106, pg. 319 (1952) for anti-convulsant activity, the Central Nervous System Activity and Acute Toxicity, Irwin, Science 136, pg. 123 (1962) for muscle relaxant and sedative-hypnotic activities, and Antagonism of Foot-Shock Induced Fighting in Mice, Tedeschi, et al., J. Pharm. and Exp. Ther., vol. 125, pg. 28 (1959) and Taming Activity in Monkeys, Randall, Diseases of the Nervous System, vol. 21, pg. 7 (1960) for anti-anxiety activity, for anti-writhing activity, Hendershot, L. C. et al., J. Pharmacol. and Exp. Ther. vol. 125 pg. 237–240 it is found that when the benzodiazepines are used as an anti-anxiety agent the dosage range is about 0.1–5 mg./kg. of body weight per day, preferably administered orally in divided dosages. When used as anti-convulsants the dosage range is about 2–30 mg./kg. of body weight per day, preferably orally administered in divided doses. When used as muscle relaxants the dosage range is about 0.1–1.5 mg./kg. of body weight per day, preferably orally administered in divided doses. When used as a sedative-hypnotic the dosage range is about 3–10 mg./kg. of body weight preferably orally administered in a single dose. Particularly desirable therapeutically effective compounds are: 7 - chloro - 1,3-dihydro - 5 - phenyl - 1(2,2,2 - trifluoroethyl) - 2H - 1,4-azepine - 2 - one; and 7 - bromo - 1,3 - dihydro - 5-phenyl - 1(2,2,2 - trifluoroethyl) - 2H - 1,4 - benzodiazepine - 2 - one; and 1 - bromo - 1,3 - dihydro - 5-phenyl - 1(2,2,2 - trifluoroethyl) - 2H - 1,4 - benzodiazepine-2-one.

TABLET FORMULATIONS (I) Formula and method of manufacture for 7-chloro-1,3 - dihydro - 5 - phenyl - 1 - (2,2,2 - trifluoroethyl)-2H-1,4-benzodiazepine-2-one Enteric coated tablets: Mg./core

| | |
|---|---|
| 7 - chloro-1,3 - dihydro - 5 - phenyl - 1-(2,2,2 - trifluoroethyl) - 2H - 1,4 - benzodiazepine-2-one, micronized | 100.0 |
| Critic acid | 1.0 |
| Lactose, USP | 33.5 |
| Dicalcium phosphate | 70.0 |
| Pluronic F–68 | 30.0 |
| Sodium lauryl sulfate | 15.0 |
| Polyvinylpyrrolidone | 15.0 |
| Carbowax 1500 | 4.5 |
| Carbowax 6000 | 45.0 |
| 3A Alcohol 50 ml./1000 cores corn starch | 30.0 |
| Dry: | |
| Sodium lauryl sulfate | 3.0 |
| Magnesium stearate | 3.0 |
| Tablet weight | 350.0 |

Procedure:

The 7 - chloro - 1,3 - dihydro - 5 - phenyl - 1 - (2,2,2-trifluoroethyl) - 2H - 1,4 - benzodiazepine - 2 - one is mixed with the citric acid, lactose, dicalcium phosphate, pluronic and sodium lauryl sulfate. The above mixture is screened through a No. 60 screen and granulated with an alcoholic solution consisting of polyvinylpyrrolidone, carbowax 1500 and 6000. Add additional alcohol, if necessary, to bring powders to a pasty mass. Add corn starch and continue mixing until uniform granules are formed. Pass through a No. 10 screen, tray and dry in oven at 100° C. for 12–14 hours. Reduce dried granulation through a No. 16 screen, add sodium lauryl sulfate and magnesium sulfate, mix and compress into desired shape on a tablet machine.

Pluronic F–68 is a U.S. registered trademark for a non-ionic surface-active agent prepared by the addition of ethylene oxide to a polypropylene glycol which has a molecular weight of 1750.

Coating:

The above cores are treated with a lacquer and dusted with talc to prevent moisture adsorption. Sub-coat layers are added to round out the core. A sufficient number of lacquer coats are applied to make the core enteric. Additional sub-coats and smoothing coats are applied to completely round out and smooth the tablet. Color coats are applied until desired shade is obtained. After drying the coated tablets are polished to give the tablets an even gloss.

(II) Capsule formulations

Formula: Mg./capsule

| | |
|---|---|
| 7 - chloro - 1,3 - dihydro - 5 - phenyl - 1 -(2,2,2 - trifluoroethyl) - 2H - 1,4 - benzodiazepine-2-one, micronized | 100.00 |
| Citric acid | 1.00 |
| Pluronic, F–68 | 40.00 |
| Sodium lauryl sulfate | 20.00 |
| Lactose | 238.00 |
| Magnesium stearate | 101.00 |
| | 400.00 |

Procedure:

Mix together 7-chloro-1,3-dihydro-5-phenyl-1(2,2,2-trifluoroethyl)-2H-1,4-benzodiazepine - 2 - one, citric acid, pluronic sodium lauryl sulfate and lactose. Pass through a No. 80 screen. Add magnesium stearate, mix and encapsulate into the proper size 2 piece gelatin capsule.

(III) Oral suspension

Formula: Mg./5 ml.

| | |
|---|---|
| 7 - chloro - 1,3 - dihydro-5-phenyl-1-(2,2,2-trifluoroethyl)-2H-1,4-benzodiazepine - 2-one, micronized | 100.0 |
| Veegum, vanderbilt | 50.0 |
| Standard granulated sugar, USP | 2500.0 |
| Sorbitol solution, USP | 1250.0 |
| Sodium saccharin, NF | 50.0 |
| Sodium benzoate, USP | 5.0 |
| Ethanol, USP ml | 0.025 |
| Menthol, USP | 1.000 |

Flavor, q.s.

Purified water, USP, to make 5 ml.

Method of Preparation:

Dissolve the sodium saccharin, sodium benzoate, standard granulated sugar and sorbitol solution in approximately 80% of the required amount of water. Disperse the Veegum in approximately 5% of the required amount of water and add the dispersion to the previously prepared syrup. Prepare a slurry of the 7-chloro-1,3-dihydro-5-phenyl - 1 - (2,2,2-trifluoroethyl)-2H-1,4-benzodiazepine-2-one with approximately 10% of the required amount of water and pass through a suitable colloid mill until free of grittiness. Add the milled active slurry to the batch. Dissolve the menthol and flavor in the alcohol and add the resulting solution to the batch. Add sufficient purified water to bring the batch to total volume. Agitate until uniform.

(IV) Suppository

Formula: Mg./2 gms.

| | |
|---|---|
| 7 - chloro - 1,3 - dihydro-5-phenyl-1-(2,2,2-trifluoroethyl)-2H-1,4 - benzodiazepine - 2 - one, micronized mgs | 100 |

Theobroma oil, Pharm. grade to make, 2 gms.

Method of preparation:

Prepare a slurry of the 7-chloro-1,3-dihydro-5-phenyl-1-(2,2,2-trifluoroethyl)-2H-1,4-benzodiazepine-2-one with a portion of the melted theobroma oil and pass the slurry through a suitable colloid mill until it is free of grittiness. Add sufficient melted theobroma oil to bring the batch to final weight. Pour the melted mix, while maintaining uniformity, into appropriately prepared molds and allow to cool.

The following examples are illustrative of the preparation of representations of the tangible embodiments of this invention:

EXAMPLE 1

7-chloro-1,3-dihydro-5-phenyl-1-(2,2,2-trifluoroethyl)-2H-1,4-benzodiazepine-2-one Prepare a solution of sodium methylate by dissolving 3.9 grams of sodium metal in 500 ml. of methanol. Add 39.0 grams of 7 - chloro-1,3-dihydro-5-phenyl-2H-1,4-benzodiazepine-2-one. Evaporate the reaction mixture to a residue and dissolve the residue in 170 ml. of dimethylformamide. Add 30 grams of 2,2,2-trifluoroethyl ioide and stir at room temperature for ½ hour, then heat to 60°–70° C. for an additional 7 hours. Add 19 grams of 2,2,2-trifluoroethyl iodide and resume the heating and stirring at 60°–70° C. for an additional 16 hours. Filter off the solids and evaporate the filtrate to a residue in vacuo. Triturate the residue with water and extract with ethyl ether. Wash the ethereal extract with water, dry over anhydrous sodium sulfate and evaporate the solvent to a residue. Extract the residue with ethyl ether and filter. Concentrate the ethereal extract to a residue. Dissolve the residue in benzene and chromatograph on 300 grams of alumina contained in a glass column 1.5 inches in diameter to give the crude product. Elute with benzene. Crystallize this product from acetone-petroleum ether to obtain the product of this example.

Alternatively, the compound of his example is prepared as follows: Heat 38.6 g. of 2'-benzoyl-5'-chloro-p-toluenesulfonamide and 5.4 g. of sodium methoxide in 250 ml. of benzene for 1 hr. under reflux. Then add 42 g. of 2,2,2-trifluoroethyl iodide and reflux athe reaction mixture with stirring for 12 hr. Cool, filter off the solids, evaporate the solvent, dissolve the residue in 100 ml. of concentrated sulfuric acid and heat the solution on the steam bath for 24 mins. Cool the solution, pour into 1 l. of water, make basic with ammonia and extract with chloroform. Wash the chloroform extracts with water, dry over anhydrous sodium sulfate and evaporate the chloroform to give 2-(2,2,2-trifluoroethyl)amino-5-chlorobenzophenone which is used in the next step.

Dissolve 29.5 grams of 2-(2,2,2-trifluoroethyl)-amino 5-chlorobenzophenone obtained above and 21.0 grams of glycine ethyl ester hydrochloride in 200 ml. of pyridine. Heat the solution to reflux and maintain the reflux with stirring for 15 hours. During the first 4 hours remove approximately 50 ml. of solvent and replace with dry pyridine. Concentrate the solution in vacuo to a residue. Triturate the residue in water and extract with ether. Filter off any remaining solids and separate the solvent layers. Adjust the pH of the aqueous solution to 8.0–8.5 and re-extract with ether. Combine the ethereal extracts and wash them with water and dry them over anhydrous sodium sulfate. Chromatograph as described above.

As is apparent to one skilled in the art, by replacing the 7-chloro-1,3-dihydro-5-phenyl-2H-1,4-benzodiazepine-2-one of Example 1 with other appropriately substituted 1,4-benzodiazepines the production of other 1-(2,2,2-trifluoroethyl) analogs may be effected by following substantially the procedure described in Example 1 above. Eyemplary of the substituted 1,4-benzodiazepines utilizable in the foregoing example are those set forth below:

8-bromo-1,3-dihydro-5-phenyl-2H-1,4-benzodiazepine-2-one 9-trifluoromethyl-1,3-dihydro-5-phenyl-2H-1,4-benzodiazepine-2-one 6-nitro-1,3-dihydro-5-phenyl-2H-1,4-benzodiazepine-2-one 7-methyl-1,3-dihydro-5-phenyl-2H-1,4-benzodiazepine-2-one 9-iodo-1,3-dihydro-5-phenyl-2H-1,4-benzodiazepine-2-one 8-propoxy-1,3-dihydro-5-phenyl-2H-1,4-benzodiazepine-2-one 6-butyl-1,3-dihydro-5-phenyl-2H-1,4-benzodiazepine-2-one 7-fluoro-1,3-dihydro-5-phenyl-2H-1,4-benzodiazepine-2-one 7-bromo-1,3-dihydro-5-phenyl-2H-1,4-benzodiazepine-2-one 8-trifluoromethyl-1,3-dihydro-5-phenyl-2H-1,4-benzodiazepine-2-one 7-methoxy-1,3-dihydro-5-phenyl-2H-1,4-benzodiazepine-2-one 9-ethoxy-1,3-dihydro-5-phenyl-2H-1,4-benzodiazepine-2-one 8-nitro-1,3-dihydro-5-phenyl-2H-1,4-benzodiazepine-2-one 1,3-dihydro-5(2-chlorophenyl)-2H-1,4-benzodiazepine-2-one 1,3-dihydro-5(3-nitrophenyl)-2H-1,4-benzodiazepine-2-one 1,3-dihydro-5(4-methoxyphenyl)-2H-1,4-benzodiazepine-2-one 1,3-dihydro-5(3-trifluoromethylphenyl)-2H-1,4-benzodiazepine-2-one 1,3-dihydro-5(2-bromophenyl)-2H-1,4-benzodiazepine-2-one
7-chloro-1,3-dihydro-5(2-chlorophenyl)-2H-1,4-benzodiazepine-2-one
9-nitro-1,3-dihydro-5(4-nitrophenyl)-2H-1,4-benzodiazepine-2-one
8-methyl-1,3-dihydro-5(3-methoxyphenyl)-2H-1,4-benzodiazepine-2-one
7-ethoxy-1,3-dihydro-5(3-bromophenyl)-2H-1,4-benzodiazepine-2-one
6-trifluoromethyl-1,3-dihydro-5(4-iodophenyl)-2H-1,4-benzodiazepine-2-one
9-butyl-1,3-dihydro-5(2-fluorophenyl)-2H-1,4-benzodiazepine-2-one
8-isopropoxy-1,3-dihydro-5(2-trifluoromethylphenyl)-2H-1,4-benzodiazepine-2-one
8-fluoro-1,3-dihydro-5(3-chlorophenyl)-2H-1,4-benzodiazepine-2-one
7-bromo-1,3-dihydro-5(4-ethoxyphenyl)-2H-1,4-benzodiazepine-2-one
9-methoxy-1,3-dihydro-5(4-nitrophenyl)-2H-1,4-benzodiazepine-2-one
9-ethyl-1,3-dihydro-5(3-iodophenyl)-2H-1,4-benzodiazepine-2-one
8-trifluoromethyl-1,3-dihydro-5-phenyl-2H-1,4-benzodiazepine-2-one
7-bromo-1,3-dihydro-5-phenyl-2H-1,4-benzodiazepine-2-one
9-nitro-1,3-dihydro-5-phenyl-2H-1,4-benzodiazepine-2-one
6-t-butyl-1,3-dihydro-5-phenyl-2H-1,4-benzodiazepine-2-one
7-isopropoxy-1,3-dihydro-5-phenyl-2H-1,4-benzodiazepine-2-one
8-iodo-1,3-dihydro-5-phenyl-2H-1,4-benzodiazepine-2-one
9-fluoro-1,3-dihydro-5-phenyl-2H-1,4-benzodiazepine-2-one
6-trifluoromethyl-1,3-dihydro-5-phenyl-2H-1,4-benzodiazepine-2-one
7-nitro-1,3-dihydro-5-phenyl-2H-1,4-benzodiazepine-2-one The compounds named above upon being treated with essentially the procedure of Example 1 above, yield the 1-(2,2,2-trifluoroethyl) products listed below:

8-bromo-1,3-dihydro-5-phenyl-1-(2,2,2-trifluoroethyl)-2H-1,4-benzodiazepine-2-one
9-trifluoromethyl-1,3-dihydro-5-phenyl-1-(2,2,2-trifluoroethyl)-2H-1,4-benzodiazepine-2-one
6-nitro-1,3-dihydro-5-phenyl-1-(2,2,2-trifluoroethyl)-2H-1,4-benzodiazepine-2-one
7-methyl-1,3-dihydro-5-phenyl-1-(2,2,2-trifluoroethyl)-2H-1,4-benzodiazepine-2-one
9-iodo-1,3-dihydro-5-phenyl-1-(2,2,2-trifluoroethyl)-2H-1,4-benzodiazepine-2-one
8-propoxy-1,3-dihydro-5-phenyl-1-(2,2,2-trifluoroethyl)-2H-1,4-benzodiazepine-2-one
6-butyl-1,3-dihydro-5-phenyl-1-(2,2,2-trifluoroethyl)-2H-1,4-benzodiazepine-2-one
7-fluoro-1,3-dihydro-5-phenyl-1-(2,2,2-trifluoroethyl)-2H-1,4-benzodiazepine-2-one
7-bromo-1,3-dihydro-5-phenyl-1-(2,2,2-trifluoroethyl)-2H-1,4-benzodiazepine-2-one
8-trifluoromethyl-1,3-dihydro-5-phenyl-1-(2,2,2-trifluoroethyl)-2H-1,4-benzodiazepine-2-one
7-methoxy-1,3-dihydro-5-phenyl-1-(2,2,2-trifluoroethyl)-2H-1,4-benzodiazepine-2-one
9-ethoxy-1,3-dihydro-5-phenyl-1-(2,2,2-trifluoroethyl)-2H-1,4-benzodiazepine-2-one
8-nitro-1,3-dihydro-5-phenyl-1-(2,2,2-trifluoroethyl)-2H-1,4-benzodiazepine-2-one
1,3-dihydro-5-(2-chlorophenyl)-1-(2,2,2-trifluorroethyl)-2H-1,4-benzodiazepine-2-one
1,3-dihydro-5-(3-nitrophenyl)-1-(2,2,2-trifluoroethyl)-2H-1,4-benzodiazepine-2-one
1,3-dihydro-5-(4-methoxyphenyl)-1-(2,2,2-trifluoroethyl)-2H-1,4-benzodiazepine-2-one
1,3-dihydro-5-(3-trifluoromethylphenyl)-1-(2,2,2-trifluoroethyl)-2H-1,4-benzodiazepine-2-one
1,3-dihydro-5-(2-bromophenyl)-1-(2,2,2-trifluoroethyl)-2H-1,4-benzodiazepine-2-one
7-chloro-1,3-dihydro-5-(2-chlorophenyl)-1-(2,2,2-trifluoroethyl)-2H-1,4-benzodiazepine-2-one
9-nitro-1,3-dihydro-5-(4-nitrophenyl)-1-(2,2,2-trifluoroethyl)-2H-1,4-benzodiazepine-2-one
8-methyl-1,3-dihydro-5-(3-methoxyphenyl)-1-(2,2,2-trifluoroethyl)-2H-1,4-benzodiazepine-2-one
7-ethoxy-1,3-dihydro-5-(3-bromophenyl)-1-(2,2,2-trifluoroethyl)-2H-1,4-benzodiazepine-2-one
6-trifluoromethyl-1,3-dihydro-5-(4-iodophenyl)-1-(2,2,2-trifluoroethyl)2H-1,4-benzodiazepine-2-one
9-butyl-1,3-dihydro-5-(2-fluorophenyl)-1-(2,2,2-trifluoroethyl)-2H-1,4-benzodiazepine-2-one
8-isopropoxy-1,3-dihydro-5-(2-trifluoromethylphenyl)-1-(2,2,2-trifluoroethyl)-2H-1,4-benzodiazepine-2-one
8-fluoro-1,3-dihydro-5-(3-chlorophenyl)-1-(2,2,2-trifluoroethyl)-2H-1,4-benzodiazepine-2-one
7-bromo-1,3-dihydro-5-(4-ethoxyphenyl)-1-(2,2,2-trifluoroethyl)-2H-1,4-benzodiazepine-2-one
9-methoxy-1,3-dihydro-5-(4-nitrophenyl)-1-(2,2,2-trifluoroethyl)-2H-1,4-benzodiazepine-2-one
9-ethyl-1,3-dihydro-5-(3-iodophenyl)-1-(2,2,2-trifluoroethyl)-2H-1,4-benzodiazepine-2-one
8-trifluoromethyl-1,3-dihydro-5-phenyl-1-(2,2,2-trifluoroethyl)-2H-1,4-benzodiazepine-2-one
7-bromo-1,3-dihydro-5-phenyl-1-(2,2,2-trifluoroethyl)-2H-1,4-benzodiazepine-2-one
6-t-butyl-1,3-dihydro-5-phenyl-1-(2,2,2-trifluoroethyl)-2H-1,4-benzodiazepine-2-one
7-isopropoxy-1,3-dihydro-5-phenyl-1-(2,2,2-trifluoroethyl)-2H-1,4-benzodiazepine-2-one
8-iodo-1,3-dihydro-5-phenyl-1-(2,2,2-trifluoroethyl)-2H-1,4-benzodiazepine-2-one
9-fluoro-1,3-dihydro-5-phenyl-1-(2,2,2-trifluoroethyl)-2H-1,4-benzodiazepine-2-one
6-trifluoromethyl-1,3-dihydro-5-phenyl-1-(2,2,2-trifluoroethyl)-2H-1,4-benzodiazepine-2-one
7-nitro-1,3-dihydro-5-phenyl-1-(2,2,2-trifluoroethyl)-2H-1,4-benzodiazepine-2-one.

EXAMPLE 2

7-chloro-1,3-dihydro-5-phenyl-1-(2,2,2-trifluoroethyl)-2H-1,4-benzodiazepine-2-one-4-oxide (A) Dissolve 50.0 grams of 7-chloro-1,3-diyhdro-5-phenyl-2H-1,4-benzodiazepine-2-one in 1250 ml. of acetic acid. Cool the solution slightly and with agitation add 50 ml. of 40% peracetic acid. Maintain this solution at room temperature for 24 hours and precipitate by the addition of 10 liters of water with agitation. Neutralize the suspension with sodium carbonate and filter. Wash the precipitate with water and crystallize 7-chloro-1,3-dihydro-5-phenyl-2H-1,4-benzodiazepine-2-one-4-oxide from alcohol for use in the next step.

(B) Prepare a solution of sodium methylate by dissolving 3.9 g. sodium metal in 500 ml. methanol. Add 39.8 of 7-chloro-1,3-dihydro-5-phenyl-2H-1,4-benzodiazepine-2-one-4-oxide, with stirring. Evaporate the methanol and dissolve the residue in 170 ml. dimethylformamide. Add 30 grams of 2,2,2-trifluoroethyl iodide and stir at room temperature for ½ hour. Heat the mixture to 60°–70° C. with stirring for 7 hours. Add 19 grams of 2,2,2-trifluoroethyl iodide and heat with stirring at 60°–70° C. for a further 16 hours. Filter off the insolubles and evaporate the filtrate to a residue in vacuo. Triturate the residue with water, extract with ether, wash the ethereal solution with water, dry the solution over anhydrous sodium sulfate and evaporate to a residue. Triturate the residue with ether and filter. Evaporate the ether to a residue, dissolve the residue in benzene and chromatograph on 300 grams of alumina contained in a glass column 1.5 inches in diameter. Elute with benzene to give the product. Crystallize this product from acetone-petroleum ether to give the purified product.

By subjecting the products enumerated after Example 1 to essentially the procedure of part A of this example, the corresponding 4-oxides are produced.

EXAMPLE 3

3-acetoxy-7-chloro-1,3-dihydro-5-phenyl-1-(2,2,2-trifluoroethyl)-2H-1,4-benzodiazepine-2-one Suspend 10 grams of 7-chloro-1,3-dihydro-5-phenyl-1-(2,2,2 - trifluoroethyl) - 2H - 1,4-benzodiazepine-2-one-4-oxide in 100 ml. of acetic anhydride. Heat the mixture on the steam bath for 30 minutes with agitation. Cool and collect the product by filtration. Crystallize from acetone-petroleum ether obtaining the product of this example.

This procedure being of substantially general applicability may be used to convert other 1,4-benzodiazepine-4-oxides to their respective 3-lower alkanoyloxy analogs. Exemplary of such 1,4-benzodiazepine-4-oxides are:

(1) 7-bromo-1,3-dihydro-5-phenyl-1-(2,2,2-trifluoroethyl)-2H-1,4-benzodiazepine-2-one-4-oxide
(2) 9-nitro-1,3-dihydro-5-phenyl-1-(2,2,2-trifluoroethyl)-2H-1,4-benzodiazepine-2-one-4-oxide
(3) 8-trifluoromethyl-1,3-dihydro-5-phenyl-1-(2,2,2-trifluoroethyl)-2H-1,4-benzodiazepine-2-one-4-oxide
(4) 6-ethoxy-1,3-dihydro-5-phenyl-1-(2,2,2-trifluoroethyl)-2H-1,4-benzodiazepine-2-one-4-oxide
(5) 7-isopropyl-1,3-dihydro-5-phenyl-1-(2,2,2-trifluoroethyl)-2H-1,4-benzodiazepine-2-one-4-oxide
(6) 9-iodo-1,3-diyhdro-5-phenyl-1-(2,2,2-trifluoroethyl)-2H-1,4-benzodiazepine-2-one-4-oxide
(7) 8-chloro-1,3-dihydro-5-phenyl-1-(2,2,2-trifluoroethyl)-2H-1,4-benzodiazepine-2-one-4-oxide
(8) 8-fluoro-1,3-dihydro-5-phenyl-1-(2,2,2-trifluoroethyl)-2H-1,4-benzodiazepine-2-one-4-oxide
(9) 6-methyl-1,3-dihydro-5-phenyl-1-(2,2,2-trifluoroethyl)-2H-1,4-benzodiazepine-2-one-4-oxide
(10) 7-nitro-1,3-dihydro-5-phenyl-1-(2,2,2-trifluoroethyl)-2H-1,4-benzodiazepine-2-one-4-oxide
(11) 6-chloro-1,3-dihydro-5-phenyl-1-(2,2,2-trifluoroethyl)-2H-1,4-benzodiazepine-2-one-4-oxide
(12) 9-methoxy-1,3-dihydro-5-phenyl-1-(2,2,2-trifluoroethyl)-2H-1,4-benzodiazepine-2-one-4-oxide
(13) 7-chloro-1,3-dihydro-5-(2-chloropehnyl)-1-(2,2,2-trifluoroethyl)-2H-1,4-benzodiazepine-2-one-4-oxide
(14) 9-nitro-1,3-dihydro-5-(4-nitrophenyl)-1-(2,2,2-trifluoroethyl)-2H-1,4-benzodiazepine-2-one-4-oxide
(15) 8-methyl-1,3-dihydro-5-(3-methoxyphenyl)-1-(2,2,2-trifluoroethyl)-2H-1,4-benzodiazepine-2-one-4-oxide
(16) 7-ethoxy-1,3-dihydro-5-(3-bromophenyl)-1-(2,2,2-trifluoroethyl)-2H-1,4-benzodiazepine-2-one-4-oxide
(17) 6-trifluoromethyl-1,3-dihydro-5-(4-iodophenyl)-1-(2,2,2-trifluoroethyl)-2H-1,4-benzodiazepine-2-one-4-oxide
(18) 9-butyl-1,3-dihydro-5-(2-fluorophenyl)-1-(2,2,2-trifluoroethyl)-2H-1,4-benzodiazepine-2-one-4-oxide
(19) 8-isopropoxy-1,3-dihydro-5-(2-trifluoromethylphenyl)-1-(2,2,2-trifluoroethyl)-2H-1,4-benzodiazepine-2-one-4-oxide
(20) 8-fluoro-1,3-dihydro-5-(3-chlorophenyl)-1-(2,2,2-trifluoroethyl)-2H-1,4-benzodiazepine-2-one-4-oxide
(21) 7-bromo-1,3-dihydro-5-(4-ethoxyphenyl)-1-(2,2,2-trifluoroethyl)-2H-1,4-benzodiazepine-2-one-4-oxide
(22) 9-methoxy-1,3-dihydro-5-(4-nitrophenyl)-1-(2,2,2-trifluoroethyl)-2H-1,4-benzodiazepine-2-one-4-oxide
(23) 9-ethyl-1,2-dihydro-5-(3-iodophenyl)-1-(2,2,2-trifluoroethyl)-2H-1,4-benzodiazepine-2-one-4-oxide The foregoing list of compounds exemplify the starting materials to be used in the process of Example 3. When such compounds are treated with the requisite lower alkanoic anhydride under the conditions of this example, the following corresponding products are produced:

(1) 3-propionyloxy-7-bromo-1,3-dihydro-5-phenyl-1-(2,2,2-trifluoroethyl)-2H-1,4-benzodiazepine-2-one
(2) 3-butanoyloxy-9-nitro-1,3-dihydro-5-phenyl-1-(2,2,2-trifluoroethyl)-2H-1,4-benzodiazepine-2-one
(3) 3-valeroyloxy-8-trifluoromethyl-1,3-dihydro-5-phenyl-1-(2,2,2-trifluoroethyl)-2H-1,4-benzodiazepine-2-one
(4) 3-caproyloxy-6-ethoxy-1,3-dihydro-5-phenyl-1-(2,2,2-trifluoroethyl)-2H-1,4-benzodiazepine-2-one
(5) 3-acetoxy-7-isopropyl-1,3-dihydro-5-phenyl-1-(2,2,2-trifluoroethyl)-2H-1,4-benzodiazepine-2-one
(6) 3-valeroyloxy-9-iodo-1,3-dihydro-5-phenyl-1-(2,2,2-trifluoroethyl)-2H-1,4-benzodiazepine-2-one
(7) 3-acetoxy-8-chloro-1,3-dihydro-5-phenyl-1-(2,2,2-trifluoroethyl)-2H-1,4-benzodiazepine-2-one
(8) 3-propionyloxy-8-fluoro-1,3-dihydro-5-phenyl-1-(2,2,2-trifluoroethyl)-2H-1,4-benzodiazepine-2-one
(9) 3-caproyloxy-6-methyl-1,3-dihydro-5-phenyl-1-(2,2,2-trifluoroethyl)-2H-1,4-benzodiazepine-2-one
(10) 3-acetoxy-7-nitro-1,3-dihydro-5-phenyl-1-(2,2,2-trifluoroethyl)-2H-1,4-benzodiazepine-2-one
(11) 3-butanoyloxy-6-chloro-1,3-dihydro-5-phenyl-1-(2,2,2-trifluoroethyl)-2H-1,4-benzodiazepine-2-one
(12) 3-acetoxy-9-methoxy-1,3-dihydro-5-phenyl-1-(2,2,2-trifluoroethyl)-2H-1,4-benzodiazepine-2-one
(13) 3-propionyloxy-7-chloro-1,3-dihydro-5-(2-chlorophenyl)-1-(2,2,2-trifluoroethyl)-2H-1,4-benzodiazepine-2-one
(14) 3-caproyloxy-9-nitro-1,3-dihydro-5-(4-nitrophenyl-1-(2,2,2-trifluoroethyl)-2H-1,4-benzodiazepine-2-one
(15) 3-butanoyloxy-8-methyl-1,3-dihydro-5-(3-methoxyphenyl)-1-(2,2,2-trifluoroethyl)-2H-1,4-benzodiazepine-2-one
(16) 3-acetoxy-7-ethoxy-1,3-dihydro-5-(3-bromophenyl)-1-(2,2,2-trifluoroethyl)-2H-1,4-benzodiazepine-2-one
(17) 3-valeryloxy-6-trifluoromethyl-1,3-dihydro-5-(4-iodophenyl)-1-(2,2,2-trifluoroethyl)-2H-1,4-benzodiazepine-2-one
(18) 3-acetoxy-9-butyl-1,3-dihydro-5-(2-fluorophenyl)-1-(2,2,2-trifluoroethyl)-2H-1,4-benzodiazepine-2-one
(19) 3-propionyloxy-8-isopropoxy-1,3-dihydro-5-(2-trifluoromethylphenyl)-1-(2,2,2-trifluoroethyl)-2H-1,4-benzodiazepine-2-one
(20) 3-valeryloxy-8-fluoro-1,3-dihydro-5-(3-chlorophenyl)-1-(2,2,2-trifluoroethyl)-2H-1,4-benzodiazepine-2-one
(21) 3-caproyloxy-7-bromo-1,3-dihydro-5-(4-ethoxyphenyl)-1-(2,2,2-trifluoroethyl)-2H-1,4-benzodiazepine-2-one
(22) 3-propionyloxy-9-methoxy-1,3-dihydro-5-(4-nitrophenyl-1-(2,2,2-trifluoroethyl)-2H-1,4-benzodiazepine-2-one
(23) 3-butanoyloxy-9-ethyl-1,3-dihydro-5-(3-iodophenyl)-1-(2,2,2-trifluoroethyl)-2H-1,4-benzodiazepine-2-one, respectively.

EXAMPLE 4

7-chloro-1,3-dihydro-3-hydroxy-5-phenyl-1-(2,2,2-trifluoroethyl)-2H-1,4-benzodiazepine-2-one Suspend 5.0 grams of the product of Example 3 in 100 ml. of alcohol. Add one equivalent of a 5% sodium hydroxide solution while stirring. Dilute the reaction mixture with water until the product is fully precipitated. Collect the product by filtration, wash with water, air dry and recrystallize from hexane to yield the compound of this example.

EXAMPLE 5

3-propionyloxy-7-chloro-1,3-dihydro-5-phenyl-1-(2,2,2-trifluoroethyl)-2H-1,4-benzodiazepine-2-one Suspend 3.7 grams of 7-chloro-1,3-dihydro-3-hydroxy-5-phenyl-1-(2,2,2 - trifluoroethyl)-2H-1,4-benzodiazepine-2-one in 25 ml. of benzene and add 1 ml. propionyl chloride. Heat the mixture to reflux and maintain for 2 hours. Cool the reaction mixture and dilute with hexane to incipient crystallization. Cool and filter obtaining the product of this example.

EXAMPLE 6

7-chloro-1,3-dihydro-3-methyl-5-phenyl-1-(2,2,2-trifluoroethyl-2H-1,4-benzodiazepine-2-one Dissolve 23.2 grams of 2-amino-5-chloro-benzophenone in 200 ml. of pyridine. Add 22.9 grams alanine ethyl ester hydrochloride and bring the mixture to reflux. Slowly distill from the reaction mixture approximately 40 ml. of solvent. Reflux the mixture for a total of about 15 hours, then cool slightly and concentrate the mixture under reduced pressure to a residue. Add water to the residue and extract with ether. If there are insolubles present, filter the mixture and separate the solvent layers. Adjust the pH of the aqueous layer to 8.0–8.5 and extract with ether. Combine the ether layers, water wash and dry. Filter and concentrate the layers to a crystalline slurry. There is obtained 7 - chloro - 1,3 - dithydro - 3 - methyl-5-phenyl-2H-1,4-benzodiazepine-2-one which is used in the next step.

Prepare a solution of sodium methylate by dissolving 1.0 gram of sodium metal in 125 ml. methanol. Add 9.8 g. of 7-chloro-1,3-dihydro-3-methyl-5-phenyl-2H-1,4-benzodiazepine-2-one and evaporate the solution to a residue. Dissolve the residue in 45 ml. of dimethylformamide. Add 8 g. of 2,2,2-trifluoroethyl iodide and stir at room temperature for ½ hour, then heat to 60°–70° C. for an additional 7 hours. Add 5 g. of 2,2,2-trifluoroethyl iodide and resume heating and stirring at 60°–70° C. for an additional 16 hours. Filter off the residue and proceed as in Example 1, obtaining the compound of this example.

EXAMPLE 7

1,3-dihydro-5-phenyl-1-(2,2,2-trifluoroethyl)-2H-1,4-benzodiazepine-2-one

Prepare a solution of sodium methylate by dissolving 2.4 grams of sodium metal in 400 ml. of methanol. Add 23.6 g. of 1,3-dihydro-5-phenyl-2H-1,4-benzodiazepine-2-one and evaporate the reaction mixture to a residue. Dissolve the residue in 150 ml. of dimethylformamide and add 25.0 g. of 2,2,2-trifluoroethyl iodide to the mixture. Stir the mixture at room temperature for ½ hour, then heat to 60°–70° C. for an additional 7 hours. Add 15 g. of 2,2,2-trifluoroethyl iodide and resume the heating and stirring at 60°–70° C. for an additional 16 hours. Filter off the solids and evaporate the filtrate to a residue in vacuo. Triturate the residue with water and extract with ethyl ether. Wash the ethereal extract with water, dry over anhydrous sodium sulfate and evaporate the solvent to a residue. Extract the residue with ethyl ether and filter off the solids. Concentrate the ethereal extract to a residue and dissolve the residue in benzene and chromatograph on 300 g. of alumina as described in previous examples obtaining the compound of this example.

EXAMPLE 8

1,3-dihydro-5-phenyl-1-(2,2,2-trifluoroethyl)-2H-1,4-benzodiazepine-2-one-4-oxide Dissolve 5.0 g. of the product of Example 7 in 125 ml. of acetic acid. Cool the solution slightly and add 5.0 ml. of 40% peracetic acid. Maintain this solution at room temperature for 24 hours and precipitate the product by the addition of 1.0 liter of cold water followed by neutralization with sodium carbonate solution. Filter and wash the precipitate with water. Crystallize from alcohol obtaining the N-oxide of this example.

EXAMPLE 9

7-chloro-1-(2,2,2-trifluoroethyl)-5-phenyl-1,3-dihydro-2H-1,4-benzodiazepine-2-one (A) 2,2,2-trifluoroethyltrichloromethyl sulfonate.—Mix 120 gms. of trichloromethylsulfonyl chloride and 50 gms. of 2,2,2-trifluoroethanol in 150 ml. of water. Heat the mixture with stirring to 50° C. and add dropwise 44 gms. of 50% sodium hydroxide solution. Stir the reaction mixture for 2 hours at 40°–45° C. Separate the layers and wash the organic layer wtih dilute ammonium hydroxide solution followed by a water wash. Dry the washed organic layer over anhydrous sodium sulfate and distil to give 2,2,2-trifluoroethyl trichloromethyl sulfonate boiling at 84–86° C./20 mm. and having the following refractive index: $N_D^{24}$ 1.4275.

(B) 2-(2,2,2-trifluoroethylamino) - 5 - chlorobenzophenone.—Mix with stirring 100 gms. of 2-amino-5-chlorobenzophenone and 61 gms. of 2,2,2-trifluoroethyl trichloromethyl sulfonate. Heat the mixture to 160° C. and hold with stirring at that temperature for 5 hours. Cool the reaction mixture to room temperature and add 2.0 liters of ethyl ether. Filter to remove the insoluble solid material and evaporate most of the ether. Add 500 ml. of benzene and re-filter the suspension. Concentrate the filtrate to give 80 gms. of an oily residue. Dissolve the residue in a minimum volume of a 2:1 hexane:benzene solvent mixture. Prepare a chromatographic column of 1000 gms. silica gel in a 2:1 hexane:benzene mixture and add the solution from above to the column. Elute the column with a 2:1 hexane:benzene mixture collecting 750 ml. fractions. Monitor the column by subjecting an aliquot of each fraction to infrared, thin layer chromatography and melting point determinations. Combine the appropriate eluates, evaporate them to a residue and crystallize the appropriate residue to yield 40.2 gms. of 2-(2,2,2-trifluoroethylamino) - 5 - chlorobenzophenone melting 99°–100° C.

By replacing the 2,2,2-trifluoromethyl sulfonate of this step with equivalent quantities of other sulfonate esters of 2,2,2-trifluoroethanol such as, 2,2,2-trifluoroethyl phenyl sulfonate
2,2,2-trifluoroethyl tolyl sulfonate
2,2,2-trifluoroethyl methyl sulfonate
2,2,2-trifluoroethyl tribromomethyl sulfonate,
2,2,2-trifluoroethyl trifluoromethyl sulfonate, and by substantially following the foregoing procedure there is produced the desired 2-(2,2,2-trifluoroethylamino)-5-chlorobenzophenone.

Similarly, by replacing the 2-amino-5-chlorobenzophenone reactant of this step with equivalent quantities of 2-aminobenzophenone
5-bromo-2-aminobenzophenone
5-trifluoromethyl-2-aminobenzophenone
5-methyl-2-aminobenzophenone
5-methoxy-2-aminobenzophenone
5-nitro-2-aminobenzophenone
3-chloro-2-aminobenzophenone
4-chloro-2-aminobenzophenone
4-trifluoromethyl-2-aminobenzophenone
6-chloro-2-aminobenzophenone, and by reacting said 2-aminobenzophenones with the sulfonate esters of 2,2,2-trifluoroethanol esters enumerated above and by following substantially the foregoing procedure there is produced, 2-(2,2,2-trifluoroethylamino)-benzophenone
2-(2,2,2-trifluoroethylamino)-5-bromobenzophenone
2-(2,2,2-trifluoroethylamino)-5-trifluoromethylbenzophenone
2-(2,2,2-trifluoroethylamino)-5-methylbenzophenone
2-(2,2,2-trifluoroethylamino)-5-methoxybenzophenone 2-(2,2,2-trifluoroethylamino)-5-nitrobenzophenone
2-(2,2,2-trifluoroethylamino)-3-chlorobenzophenone
2-(2,2,2-trifluoroethylamino)-4-chlorobenzophenone
2-(2,2,2-trifluoroethylamino)-4-trifluoromethylbenzophenone
2-(2,2,2-trifluoroethylamino)-6-chlorobenzophenone, respectively.

(C) 2-[N-(2,2,2-trifluoroethyl) - α - bromoacetamido]-5-chlorobenzophenone.—Dissolve 40.0 gms. of the product of step B in 750 ml. of benzene and add 31 gms. of bromoacetyl bromide. Heat the mixture to reflux and hold there for 3 hours. Cool the benzene solution and wash 3 times with water totaling approximately 450 ml. Dry the benzene solution over anhydrous sodium sulfate and evaporate. Crystallize the residue from hexane to yield 52.1 gms. of 2-[N-(2,2,2-trifluoroethyl)-α-bromoacetamido]-5-chlorobenzophenone melting 115°–117° C.

By replacing the 2-(2,2,2-trifluoroethylamino)-5-chlorobenzophenone (product of step B) of this example with equivalent quantities of the benzophenones listed after step B above and by following substantially the procedure of this step there is produced, 2-[N-(2,2,2-trifluoroethyl)-2-bromoacetamido]-benzophenone
2-[N-(2,2,2-trifluoroethyl)-2-bromoacetamido]-5-bromobenzophenone
2-[N-(2,2,2-trifluoroethyl)-2-bromoacetamido]-5-trifluoromethylbenzophenone
2-[N-(2,2,2-trifluoroethyl)-2-bromoacetamido]-5-methylbenzophenone
2-[N-(2,2,2-trifluoroethyl)-2-bromoacetamido]-5-methoxybenzophenone
2-[N-(2,2,2-trifluoroethyl)-2-bromoacetamido]-5-nitrobenzophenone
2-[N-(2,2,2-trifluoroethyl)-2-bromoacetamido]-3-chlorobenzophenone
2-[N-(2,2,2-trifluoroethyl)-2-bromoacetamido]-4-chlorobenzophenone
2-[N-(2,2,2-trifluoroethyl)-2-bromoacetamido]-4-trifluoromethylbenzophenone
2-[N-(2,2,2-trifluoroethyl)-2-bromoacetamido]-6-chlorobenzophenone, respectively.

(D) 7-Chloro-1-(2,2,2-trifluoroethyl) - 5 -phenyl-1,3-dihydro-2H-1,4-benzodiazepine-2-one.—Dissolve 52 gms. of the product of step C in 1.0 liter of chloroform and bubble ammonia gas through the solution at room temperature for 18 hours. Evaporate the chloroform under reduced pressure, wash the residue with water, extract the residue with ether and wash the ethereal solution with water. Dry the solution over anhydrous sodium sulfate and evaporate the the solution to a residue. Crystallize the residue from an acetone-petroleum ether mixture to yield 30 gms. of 7-chloro-1-(2,2,2-trifluoroethyl) - 5 - phenyl-1,3-dihydro-2H-1,4-benzodiazepine-2-one melting 164°–166° C.

By replacing the 2-[N-(2,2,2-trifluoroethyl)-2-bromoacetamido]-5-chlorobenzophenone of this step with equivalent quantities of the benzophenones listed in step C above, and by following substantially the procedure of this step there is produced:

1-(2,2,2-trifluoroethyl)-5-phenyl-1,3-dihydro-2H-1,4-benzodiazepine-2-one
7-bromo-1-(2,2,2-trifluoroethyl)-5-phenyl-1,3-dihydro-2H-1,4-benzodiazepine-2-one
7-trifluoromethyl-1-(2,2,2-trifluoroethyl)-5-phenyl-1,3-dihydro-2H-1,4-benzodiazepine-2-one
7-methyl-1-(2,2,2-trifluoroethyl)-5-phenyl-1,3-dihydro-2H-1,4-benzodiazepine-2-one
7-methoxy-1,-(2,2,2-trifluoroethyl)-5-phenyl-1,3-dihydro-2H-1,4-benzodiazepine-2-one
7-nitro-1-(2,2,2-trifluoroethyl)-5-phenyl-1,3-dihydro-2H-1,4-benzodiazepine-2-one
9-chloro-1-(2,2,2-trifluoroethyl)-5-phenyl-1,3-dihydro-2H-1,4-benzodiazepine-2-one
8-chloro-1-(2,2,2-trifluoroethyl)-5-phenyl-1,3-dihydro-2H-1,4-benzodiazepine-2-one
8-trifluoromethyl-1-(2,2,2-trifluoroethyl)-5-phenyl-1,3-dihydro-2H-1,4-benzodiazepine-2-one
6-chloro-1-(2,2,2-trifluoroethyl)-5-phenyl-1,3-dihydro-2H-1,4-benzodiazepine-2-one, respectively.

EXAMPLE 10

7-chloro-1-(2,2,2-trifluoroethyl)-5-phenyl-1,3-dihydro-2H-1,4-benzodiazepine-2-one (A) P-chloro - N - (2,2,2-trifluoroethyl)-aniline.—Add dropwise with stirring 286 gms. of 2,2,2-trifluoroethyl trichloromethyl sulfonate to a refluxing solution of 319 gms. of p-chloroaniline in 800 ml. of toluene. Reflux the reaction mixture for 10 hours, cool and filter off the solid material. Extract the filtrate with dilute hydrochloric acid. Evaporate the toluene and distill the residue under reduced pressure to obtain the p-chloro-N-(2,2,2-trifluoroethyl)-aniline boiling at 116°–119° C./16 mm.

(B) 2 - (2,2,2 - trifluoroethylamino) - 5 - chlorobenzophenone.—Stir 5 gms. of the product from step A above with 15.5 gms. of anhydrous aluminum chloride and 8.2 gms. of benzoyl chloride in 40 ml. of carbon disulfide for 3 hours at room temperature. Heat the mixture to reflux and maintain for an additional 3 hours. Add an ice cold solution of dilute hydrochloric acid. Separate the solvent layers and remove the carbon disulfide by distillation to a residue. Dissolve the residue in an aqueous alcoholic hydrochloric acid solution and reflux the solution for 1 hour. Cool the solution and extract with ethyl ether to remove the desired product. Wash the ethereal extract with water to remove the excess acid and concentrate the extract to a residue. Dissolve the residue in a minimum volume of 2:1 hexane:benzene and process as in Example 9 step B to yield the title product of this step melting at 100° C.

(C) 2 - [ - (2,2,2 - trifluoroethyl) - 2 - bromoacetamido]-5-chlorobenzophenone.—Perform the process described in Example 9 step C above on 2-(2,2,2-trifluoroethlyamino)-5-chlorobenzophenone to yield the title product melting at 114°–117° C.

(D) 7 - chloro - 1 - (2,2,2 - trifluoroethyl) - 5 - phenyl-1,3,-dihydro-2H-1,4-benzodiazepine-2-one.—Perform the process of Example 9 step D on the product from step C above to yield the product of this example.

In a similar manner by substituting the benzoyl chloride of part B of this example with o-chlorobenzoyl chloride and by substantially following the procedures of parts B and C of this example, there is produced 2-[N-(2,2,2-trifluoroethyl)-2-bromoacetamido] - 2′,5 - dichlorobenzophenone. Suspend the product in 40 ml. of a 1:1 mixture of ether and 2 N ammonium hydroxide and stir at room temperature until the solids dissolve. Separate the solvent layers and dry the ether layer over anhydrous sodium sulfate. Evaporate the solution to a residue to obtain 2(N-2,2,2-trifluoroethyl-N-aminoacetyl)-amino-2′,5-dichlorobenzophenone.

EXAMPLE 11

7-chloro-1-(2,2,2-trifluoroethyl)-5-phenyl-1,3-dihydro-2H-1,4-benzodiazepine-2-one (A) N - (α - bromoacetyl) - P - chloro - N - (2,2,2 - trifluoroethyl)-aniline.—Reflux a solution of 20 gms. p-chloro-N-(2,2,2-trifluoroethyl)-aniline as prepared in step A of Example 10 above with 19 gms. of α-bromoacetyl bromide in 400 ml. of benzene. Continue the reflux for 3 hours and cool the mixture to room temperature. Wash the benzene solution with water and dry it over anhydrous sodium sulfate. Evaporate the benzene and crystallize the residue to give the N-(α-bromoacetyl)-p-chloro-N-(2,2,2-trifluoroethyl)-aniline.

(B) 5 - chloro - 2 - [N-(2,2,2 - trifluoroethyl) - 2 - bromoacetamido]-benzophenone.—Dissolve 11 gms. of the product from step A above in carbon disulfide, add 13 gms. of anhydrous aluminum chloride and 7 gms. of benzoyl chloride and stir at room temperature for 18 hours. Add an ice cold solution of dilute hydrochloric acid and stir the mixture for 10 to 15 minutes. Separate the solvent layers and process as in step C Example 9 above to obtain the title product melting 110°–117° C.

(C) 7 - chloro - 1 - (2,2,2 - trifluoroethyl) - 5 - phenyl-1,3-dihydro-2H-1,4-benzodiazepine-2-one.—Dissolve the product of step B above in chloroform and subject the solution to the process of Example 9 step D to obtain the title product whose melting point is 164°–166° C.

EXAMPLE 12

7-chloro-1-(2,2,2-trifluoroethyl)-5-phenyl-1,3-dihydro-2H-1,4-benzodiazepine-2-one-4-oxide (A) 2 - [2 - (N - acetoxyacetamido) - N - (2,2,2 - trifluoroethyl) - acetamido] - 5 - chlorobenzophenone.—Dissolve 31.4 gms. of 2-(2,2,2-trifluoroethylamino)-5-chlorobenzophenone and 19.4 gms. of N acetoxy-N-acetylglycylchloride in 500 ml. of benzene and heat the solution to reflux. Hold the solution at reflux for 3 hours and remove the benzene under reduced pressure. Crystallize the residue from an acetone-petroleum ether mixture to give the product of this example.

(B) 7 - chloro - 1 - (2,2,2 - trifluoroethyl) - 5 - phenyl-1,3-dihydro-2H-1,4-benzodiazepine-2-one - 4 - oxide.—Dissolve 27 gms. of the product of step A above in 100 ml. of ethyl alcohol. Add 10 ml. of 15% hydrochloric acid and reflux for 15 minutes. Dilute with water and chill the mixture. Collect the solids by filtration. Wash the solids with mother liquor and with water and dry at 50° C. Crystallize the solids from alcohol to yield the product of this example.

EXAMPLE 13

(A) 7-chloro-1-(2,2,2-trifluoroethyl)-5-phenyl-1,3-dihydro-2H,1,4-benzodiazepine-2-one Prepare 20 ml. of a saturated solution of hydrogen bromide in acetic acid and cool to room temperature. Add to this solution 2 grams of 2-[2-carbobenzoxamido-N-(2,2,2-trifluoroethyl) [acetamido-5-chlorobenzophenone and stir the mixture for 1 hour. Concentrate the solution under reduced pressure and below 35° C. to a residue and add ether (20 ml.) to give a pasty suspension. Add 20 ml. of cold dilute (2 N) ammonium hydroxide and mix thoroughly. Separate the solvent layers and dry the ether layer over anhydrous sodium sulfate. Evaporate the solution to a residue to obtain the 2-[N-glycyl-N-(2,2,2-trifluoroethyl)]amino-5-chlorobenzophenone.

(B) 7-chloro-1-(2,2,2-trifluoroethyl)-5-phenyl-1,3-dihydro-2H-1,4-benzodiazepine-2-one.—Dissolve 1 gram of the product from step above in 25 ml. of xylene. Reflux the mixture for 3 hours and remove the solvent under reduced pressure to a residue and crystallize the residue acetone-petroleum ether to obtain the title compound.

EXAMPLE 14

7-chloro-1-(2,2,2-trifluoroethyl)-5-phenyl-1,3-dihydro-2H-1,4-benzodiazepine-2-one Dissolve 10 grams of 2-[N-phthalimidoacetyl-N-(2,2,2-trifluoroethyl)]amino-5-chlorobenzophenone in a mixture of 100 ml. of chloroform and 100 ml. of ethanol. Add a solution of 2.5 grams of hydrazine hydrate in 2.5 ml. of water. Allow the mixture to stand at room temperature for 24 hours and remove the solvents under reduced pressure at or below 35° C. Triturate the residue with a 1:1 mixture of 2 N ammonium hydroxide and ether until the solids have dissolved. Separate the solvent layers and extract the ether layer with a 10% hydrochloric acid solution. Basify the acid extract and back-extract it with ether. Evaporate the ether layer to a residue and crystallize the product to obtain the 7-chloro-1-(2,2,2 - trifluoroethyl) - 5 - phenyl-1,3-dihydro-2H-1,4-benzodiazepine-2-one product of this example melting at 164°–165.5° C.

I claim:
1. A compound selected from the group of compounds having the structural formula:

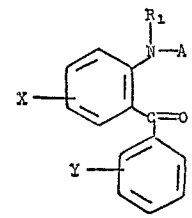

wherein $R_1$ is polyfluoroloweralkyl; A is a member selected from the group consisting of

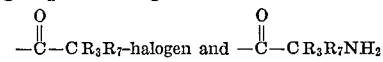

$R_3$ and $R_7$ are members selected from the group consisting of hydrogen and lower alkyl; and X and Y are members selected from the group consisting of hydrogen, halogen, trifluoromethyl, nitro, lower alkyl and lower alkoxy.

2. A compound of claim 1 wherein $R_1$ is trifluoroethyl; A is

wherein $R_3$ and $R_7$ are members selected from the group consisting of hydrogen and lower alkyl.

3. The compound of claim 2 wherein X is 5-chloro, Y is chloro at the 2'-position and A is

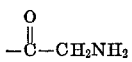

said compound being 2-(N-2,2,2-trifluoroethyl-N-aminoacetyl)-amino-2',5-dichlorobenzophenone.

4. A compound selected from the group of compounds having the structural formula:

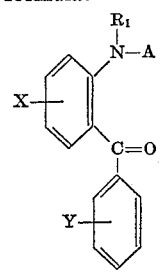

wherein $R_1$ is polyfluoroloweralkyl; A is

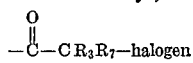

wherein $R_3$ and $R_7$ are members selected from the group consisting of hydrogen and lower alkyl; and X and Y are members selected from the group consisting of hydrogen, halogen, trifluoromethyl, nitro, lower alkyl and lower alkoxy.

5. The compound of claim 4 wherein X is 5-chloro, Y is hydrogen and A is

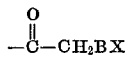

said compound being 2-(N-2,2,2-trifluoroethyl-N-bromoacetyl)-amino-5-chlorobenzophenone.

References Cited

UNITED STATES PATENTS 3,136,815    1964    Reeder et al. _____ 260—562

JOHN D. RANDOLPH, Primary Examiner

H. I. MORATZ, Assistant Examiner

U.S. Cl. X.R.

260—326, 338, 340.7, 340.9, 239.3, 570, 319.1, 326.16, 558, 472, 482, 556, 577, 574, 454, 551; 424—324, 244, 330

UNITED STATES PATENT OFFICE
CERTIFICATE OF CORRECTION

Patent No. 3,641,147  Dated February 8, 1972

Inventor(s) John G. Topliss

It is certified that error appears in the above-identified patent and that said Letters Patent are hereby corrected as shown below:

Column 1, Formula I

"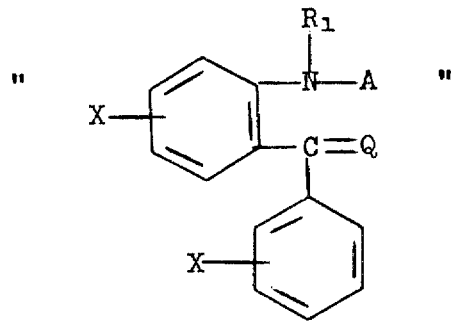"

should read

---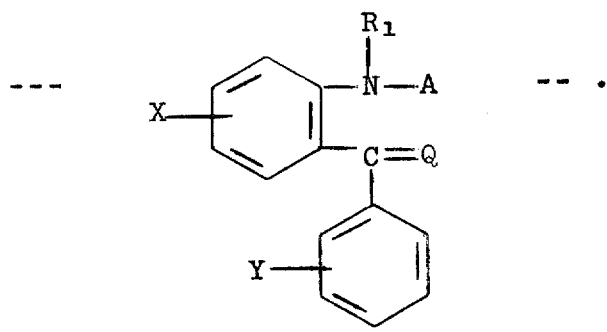---.

Column 2, lines 8 - 14

"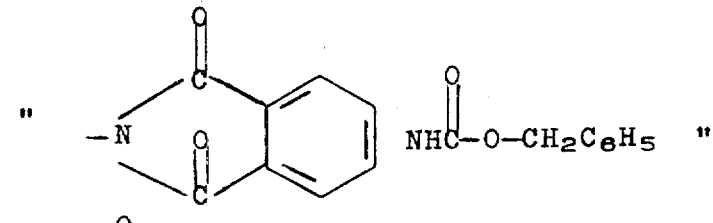"

should read ---phthalimido, NHC—O—CH$_2$C$_6$H$_5$;---

PO-1050
(5/69)

UNITED STATES PATENT OFFICE
CERTIFICATE OF CORRECTION

Patent No. 3,641,147          Dated February 8, 1972

Inventor(s) John G. Topliss

It is certified that error appears in the above-identified patent and that said Letters Patent are hereby corrected as shown below:

-2-

Column 3, line 62 "tetaralin" should read --tetralin--.
Column 4, line 27 "methods" should read --method--. Column 4, line 50 "No numerical designation (VII)" should read --VII--.
Column 5, line 36 "2-amino-bezophenone" should read --2-amino-benzophenone--. Column 5, line 44 "(VIII)" should read --(VII)--.
Column 6, lines 1 and 2 "Reaction Scheme D:" should read --Reaction Scheme D:
D-1:--. Column 6 "Under Reaction Scheme D there is no IV ⟵ " should read --IV ⟵ --. Column 6, line 12
                    △                              △
"No Reaction Scheme "D-2:" should read --D-2:--. Column 8, line 66 "of the foregoing" should read --the foregoing--. Column 10, line 4 "azepine-2-one; and 7-bromo-1,3-dihydro-" should read --benzodiazepine-2-one; 7-nitro-1,3-dihydro---. Column 10, line 6 "and 1-bromo-1,3-" should read --and 7-bromo-1,3- --. Column 11, line 39 "Mg./2 gms." should read --mg/2 mgs--. Column 11, lines 40 - 42 "7-chloro-1,3-dihydro-" should read --2-(N-aminoacetyl- --.
Column 11, lines 45 and 46 "7-chloro-" should read --2-(N-aminoacetyl- --. Column 12, line 6 "his example" should read --this example--. Column 12, line 10 "athe" should read --the--.
Column 12, line 39 "Eyemplary" should read --Exemplary--. Column 17, line 28 "1,3-dithydro-" should read --1,3-dihydro- --.
Column 18, line 18 " $N_D^{24}$ 1.4275." should read -- $N_D^{24}$ 1.4275.---.

Column 20, line 36 "(C) 2-/ - (2,2,2-" should read --C. 2-/N̄-(2,2,2- --. Column 21, line 5 "110°-117°C" should read --115° - 117°C--. Column 21, line 54 "acetone-petroleum" should read --from acetone-petroleum--. Claim 2, line 4 " $-\overset{O}{\overset{\|}{C}}-CR_3R_9NH_2$" should read -- $-\overset{O}{\overset{\|}{C}}-CR_3R_7NH_2$ --. Claim 5, line 4 " $-\overset{O}{\overset{\|}{C}}-CH_2BX$" should read -- $-\overset{O}{\overset{\|}{C}}-CH_2Br$ --.

Signed and sealed this 20th day of June 1972.

(SEAL)
Attest:

EDWARD M. FLETCHER, JR.          ROBERT GOTTSCHALK
Attesting Officer                 Commissioner of Patents